No. 648,196. Patented Apr. 24, 1900.
W. P. DICKINSON.
DENTAL MATRIX HOLDER.
(Application filed Jan. 24, 1900.)

(No Model.)

UNITED STATES PATENT OFFICE.

WILLIAM P. DICKINSON, OF MINNEAPOLIS, MINNESOTA, ASSIGNOR TO JAMES W. IVORY, OF PHILADELPHIA, PENNSYLVANIA.

DENTAL-MATRIX HOLDER.

SPECIFICATION forming part of Letters Patent No. 648,196, dated April 24, 1900.

Application filed January 24, 1900. Serial No. 2,572. (No model.)

*To all whom it may concern:*

Be it known that I, WILLIAM P. DICKINSON, a citizen of the United States, residing at Minneapolis, in the county of Hennepin, State of Minnesota, have invented a new and useful Improvement in Dental-Matrix Holders, which improvement is fully set forth in the following specification and accompanying drawings.

My invention consists of a holder for a dental matrix formed of wedge-shaped jaws or points, carriers therefor, and means for forcing said jaws toward each other, whereby they bear against the matrix and retain the same firmly in position, and a compound joint whereby said jaws are adapted to conform vertically and horizontally to any construction or irregularities in the form of teeth.

Figure 1:
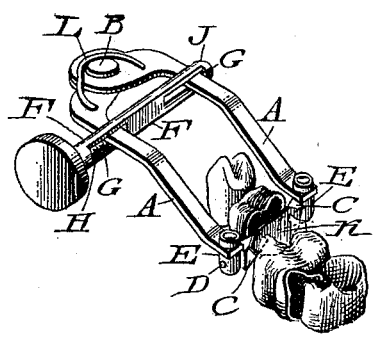
Figure 2:
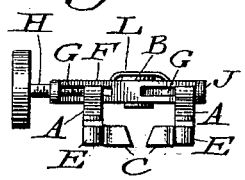
Figure 3:
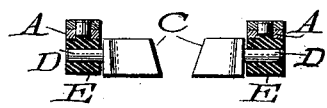

Figure 1 represents a perspective view of a dental-matrix holder embodying my invention. Fig. 2 represents an end elevation thereof. Fig. 3 represents a section thereof on line $x\, x$, Fig. 1.

Similar letters of reference indicate corresponding parts in the figures.

Referring to the drawings, A designates a pair of arms or levers, which are connected at one end by the pivot B and provided at the other end with the wedge-shaped jaws or points C, the latter having journals D, which are mounted in the bosses or bearing-pieces E, the latter being swiveled on said arms A, it being noticed that the bearing-pieces are rotatable on the arms A and the jaws are rotatable in said pieces, forming a compound joint the members of which are independent of each other in planes at or about at a right angle to each other, the journals D being horizontal, or approximately so, and the pieces E vertical, or approximately so.

F designates a yoke which is formed with slots G, through which freely pass the arms A, one end of said yoke having fitted to it the screw H, which is adapted to bear against the adjacent arm A, while the opposite closed end J of the yoke is adapted to bear against the other arm, it being evident that by properly rotating said screw H said arms may be drawn together and the jaws C thereby caused to approach each other.

K designates the matrix, which is adapted to be placed by the side of a cavity in a tooth to be filled and requires to be firmly held in position.

When the matrix is located, the jaws bear against the back or outer face of the same, after which the screw H is rotated, whereby the arms A are drawn together and the jaws moved toward each other, so as to press the matrix against the tooth and hold the same firmly in position. Owing to any inequalities in the outer face of the tooth, or from other causes, the jaws may turn on the bosses E and the latter may turn on the arms A, whereby the matrix is made to conform to the contour of the tooth and is firmly retained in position, and the operation of filling may be conveniently and reliably performed. When the screw is properly rotated in the reverse directions, the arms separate, due to the action of the spring L employed, and the jaws open, whereby they leave the matrix, and the latter may be removed.

Having thus described my invention, what I claim as new, and desire to secure by Letters Patent, is—

1. In a dental-matrix holder, an arm, a point and a compound joint connecting said point with said arm, whereby said point is adapted to accommodate itself to the matrix in both vertical and horizontal directions.

2. A dental matrix having a point, a carrying-arm therefor and an intermediate joint consisting of a boss, a journal thereon mounted on said arm, and a journal on said point mounted on said boss, said journal being at or about a right angle to each other.

WILLIAM P. DICKINSON.

Witnesses:
E. F. HERTZ,
W. H. LANDIS.